(12) United States Patent
Severson et al.

(10) Patent No.: US 6,191,499 B1
(45) Date of Patent: Feb. 20, 2001

(54) SYSTEM AND METHOD FOR PROVIDING VOLTAGE REGULATION TO A MULTIPLE PROCESSOR

(75) Inventors: Paul Steven Severson, Rochester; Steven Brian Zamzow, Eyota; Jan Douglas Smid; Paul Jeffrey La Rocca, both of Rochester, all of MN (US)

(73) Assignee: International Business Machines Corporation, Armonk, NY (US)

( * ) Notice: Under 35 U.S.C. 154(b), the term of this patent shall be extended for 0 days.

(21) Appl. No.: 09/418,046

(22) Filed: Oct. 13, 1999

(51) Int. Cl.[7] .................................................. H02J 1/00
(52) U.S. Cl. ............................................................ 307/31
(58) Field of Search ........................ 307/31, 64; 361/90, 361/704; 340/660, 64; 363/147; 714/6, 11; 323/267

(56) References Cited

U.S. PATENT DOCUMENTS

| | | | |
|---|---|---|---|
| 5,325,363 | * 6/1994 | Lui | 371/8.1 |
| 5,513,062 | 4/1996 | Paul et al. | 361/190 |
| 5,648,759 | 7/1997 | Miller et al. | 340/660 |
| 5,814,977 | * 9/1998 | Kim | 323/267 |
| 5,834,856 | 11/1998 | Tavallaei et al. | 307/64 |
| 5,847,951 | 12/1998 | Brown et al. | 363/147 |
| 5,901,038 | * 5/1999 | Cheng et al. | 361/704 |
| 5,923,830 | * 7/1999 | Fuchs et al. | 395/182.09 |

* cited by examiner

*Primary Examiner*—Stephen W. Jackson
*Assistant Examiner*—Sharon Polk
(74) *Attorney, Agent, or Firm*—Felsman, Bradley, Vaden, Gunter & Dillon, LLP

(57) ABSTRACT

A voltage regulation system, method of operation and multiple processor apparatus employing the system or method. The voltage regulation system includes a plurality of voltage regulation modules (VRMs) coupled to a plurality of processors, each one of the VRMs is dedicated to only one of the plurality of processors wherein a processor is powered down in response to a failure of its respective dedicated VRM.

17 Claims, 3 Drawing Sheets

SYSTEM AND METHOD FOR PROVIDING VOLTAGE REGULATION TO A MULTIPLE PROCESSOR

BACKGROUND OF THE INVENTION

1. Technical Field

The present invention relates generally to power regulation and in particular to multiple processor machines. Still more particularly, the present invention relates to a voltage regulation system, method of operation and multiple processor apparatus employing the system or method.

2. Description of the Related Art

With the proliferation of small computers and the extension of their use into more powerful applications and network-centric computing environments, the performance requirements for these computing machines are increasing to ever higher levels. Consequently, the application of multiple processors, or N-way processors, are increasingly being applied in lower-end, i.e., lower cost, machines.

As processor performance has increased, voltage levels used to power these processors has correspondingly decreased. Additionally, as input voltage levels have decreased, input current has increased along with dynamic current effects needed to support higher speed operation of these processors. This has necessitated the need for "point of load" voltage regulation that is implemented in close proximity to the processor. To provide for this point of load voltage regulation, small Voltage Regulator Modules (VRMs) are becoming standard devices and are presently employed to power these new low voltage processors.

Currently, in multiple processor, or N-way processor machines, each processor is typically powered by two paralleled VRMs. Additionally, in certain custom designs, a bank of processors is powered by a N+1 (where N is the minimum number of regulator required to run the processor bank) bank of regulator engines. In both cases, redundancy in the VRMs is utilized to keep all the processors in operation in the event of a failure in the voltage regulation stage that is powering the processor or processors. Both of the above-described redundant systems, i.e., parallel and N+1, however, are not 100% fault tolerant. There are certain failure modes, e.g., a short circuit condition in a processor supported by the VRMs, that may shut down the entire system. This lack of robustness permits a failure in a single processor to take down the entire multiple processor machines.

Furthermore, with lower-end multiple processor machines, cost considerations are of paramount importance. The implementation of redundant systems, as described above, invariably increases the cost of multiple processor machines. For example, in a dual redundant system wherein two VRMs are used to power a single processor, the cost of the multiple processor machine attributable to the VRMs are doubled. Similarly, employing a N+1 bank of regulator engines also raises the cost and complexity of a multiple processor machine due to the added regulator, along with the complex monitoring and switching circuitry that must be employed to ensure that all the processors are in operation.

Accordingly, what is needed in the art is an improved voltage regulation system that mitigates the above-described limitations and, more particularly, a voltage regulation system that is more robust and cost effective to implement in a multiple processor machine.

SUMMARY OF THE INVENTION

It is therefore an object of the present invention to provide an improved voltage regulation system, method of operation and a multiple processor apparatus employing the system or method.

To achieve the foregoing object, and in accordance with the invention as embodied and broadly described herein, a voltage regulation system for use with a multiple processor apparatus is disclosed. The voltage regulation system includes a plurality of voltage regulation modules (VRMs) coupled to a plurality of processors, each one of the VRMs is dedicated to only one of the plurality of processors wherein a processor is powered down in response to a failure of its respective dedicated VRM.

In one embodiment of the present invention the number of processors and number of VRMs utilized are equal. In a related embodiment, the multiple processor apparatus is a N-way processor.

In yet another embodiment of the present invention, each pair of processor and dedicated VRM defines a separate power domain. In an advantageous embodiment, each pair of processor and dedicated VRM is located on a separate circuit card. This arrangement electrically isolates each pair of processor and VRM from each other, thus preventing failures in one pair from affecting the others.

In another embodiment of the present invention, the plurality of VRMs are coupled to a power converter that, in an advantageous embodiment, is a DC—DC converter. It should be apparent to those skilled in the art that the type of power converter employed is dependent on the nature of the external power source that is available. Consequently, if the external power source provides an AC voltage, the power converter may be a rectifier.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF ILLUSTRATIVE EMBODIMENT

Figure 1:
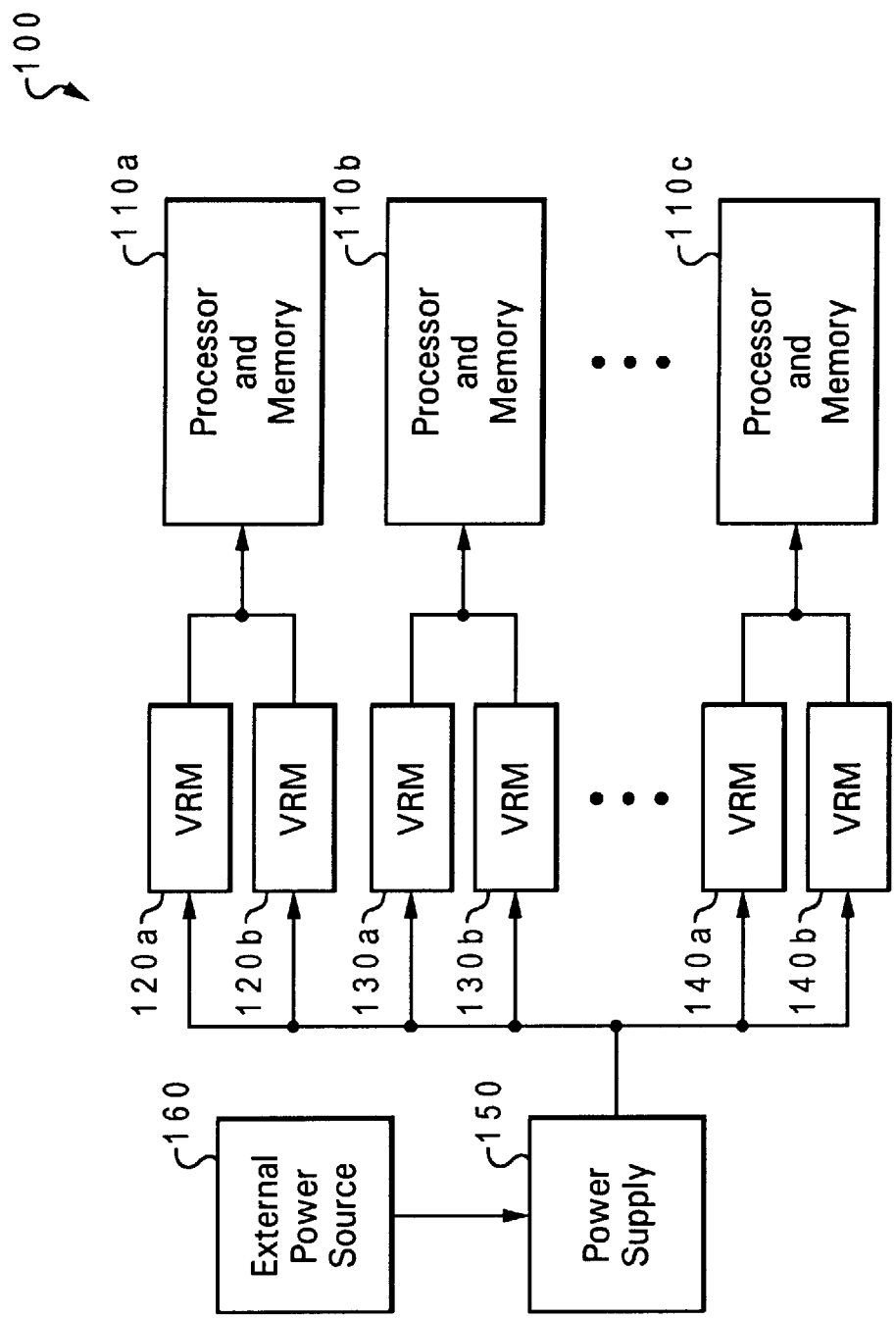
FIG. 1 illustrates a multiple processor apparatus employing a conventional parallel voltage regulation scheme.

With reference now to the figures, and in particular, with reference to FIG. 1, there is depicted a multiple processor apparatus 100 employing a conventional parallel voltage regulation scheme. Multiple processor 100 includes a plurality of processors, designated first, second and third processor 110a, 110b, 110c, respectively, that are coupled to a dual redundant bank of voltage regulator modules (VRMs). The dual redundant bank of VRMs provide pairs of VRMs, which are coupled in parallel, to supply a regulated, typically DC, voltage to each individual processor. Thus, as shown in the illustrated embodiment, first and second VRMs 120a, 120b, respectively, provide a regulated voltage to first processor 110a, third and fourth VRMs 130a, 130b, respectively, power second processor 110b and fifth and sixth VRMs 140a, 140b, respectively, provide power to third processor 110c. Also shown is an external power source 160, such as a commercial power source, coupled to a power supply 150, such as a DC—DC converter or a AC-DC converter, that provides a front-end supply voltage to all of the VRMs.

The primary purpose of implementing a parallel voltage regulation system is to ensure the continued operation of all the processors in the event of a failure in the voltage regulation stage, i.e., VRMs, powering the plurality of processors. For example, if first VRM 120a fails, first processor 110a will still be powered by second VRM 120b ensuring first processor 110a continued and uninterrupted operation. This fault tolerant operational scheme allows for a single failure in each pair of VRMs.

Although the parallel scheme described above provides redundancy, it is not 100% fault tolerant. There are certain failure modes that could result whereby a failure of one VRM in a pair of VRMs also results in the failure of its companion VRM that, in turn, brings down the entire system with the current systems employed currently. Examples of these failure conditions include a short in an output capacitor and a short circuit condition within a processor. Another problem that results from parallel coupling VRMs is in the area of current sharing.

Generally, current sharing between two parallel coupled VRMs is passive. In other words, the amount of current sourced by each VRM in a pair depends on many variables. If the current sourced by the individual VRM in a pair are significantly unbalanced, the VRM providing the majority of the input current to the processor will ultimately have a shorter operational life than its companion VRM which remains operationally "idle." In the event that the VRM providing the majority of the current to its associated processor fails, the idled VRM may not be able to supply instantaneously the required current and still provide the necessary voltage regulation. During the transition period for the VRM to stabilize its output voltage and current, errors may be introduced into its associated processor's operation. To ensure equitable current sharing between the two VRMs in a pair further increases the complexity and cost of the voltage regulation stage.

Figure 2:
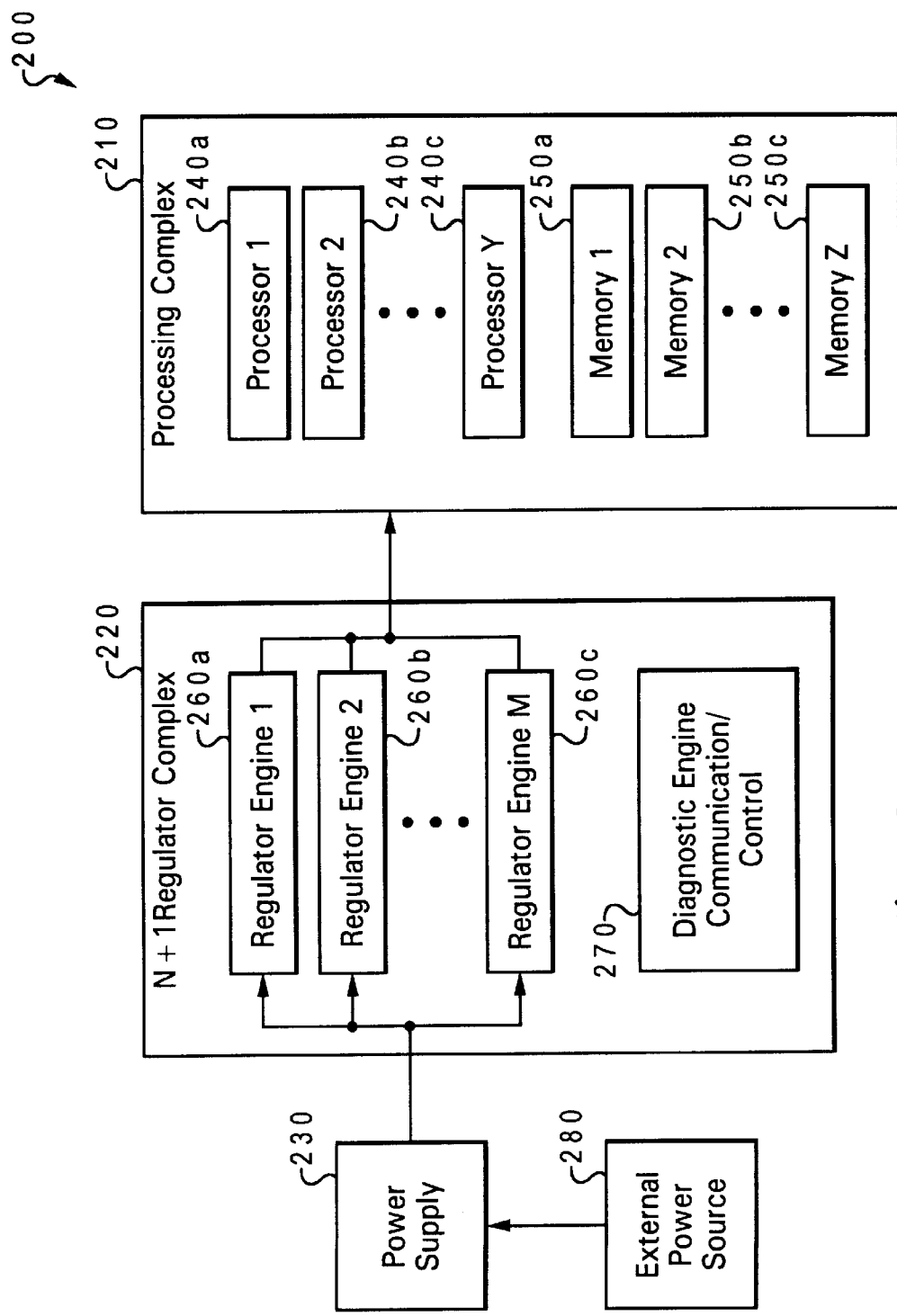
FIG. 2 illustrates a multiple processor apparatus employing another conventional voltage regulation scheme wherein a N+1 regulator complex supplies regulated power to a processor bank.

Referring now to FIG. 2, there is illustrated a multiple processor apparatus 200 employing another conventional voltage regulation scheme wherein a N+1 regulation complex supplies regulated power to Y processors. Multiple processor 200 includes a processing complex 210 having a plurality of Y (where Y is an integer greater than 1) processors, generally designated 240a–240c, and a plurality of Z memory, generally designated 250a–250c. Multiple processor 200 also includes a regulator complex 220 that comprises a plurality of N+1 regulator engines, generally designated 260a–260c, and a diagnostic engine controller 270. Also shown in the illustrated embodiment is an external power source 280 coupled to a power supply 230 that provides a supply voltage to regulator engines 260a–260c, which in turn, provide a regulated voltage to processors 240a–240c. Regulator complex 220 is configured in a N+1 fashion so that the one redundant regulator engine is utilized as a back-up.

Generally, all of M regulator engines 260a–260c is assigned to supply a regulated voltage to all of Y processors 240a–240c using a common power domain. For example, M regulator engines 260a–260c operate together to provide power to all Y processors 240a–240c. The remaining regulator engine is utilized as a back-up in the event of a regulator engine failure to ensure that all the processors remain in operation. In the event of a regulator failure, controller 270 will sense and identify the failed regulator engine. After identifying the failed regulator engine, controller 270 will communicate the failure to a host system (not shown).

Within this redundant scheme, the design point is very redundant. Unless the regulator engines are isolated from each other, however, this topology is not 100% fault tolerant. There exists a possibility that some small number of failures could result in the power conversion stage, i.e., regulator engine, shutting itself down and, consequently, the processor that it powers. These failures include a short in the output capacitor or a short in a processor, in which case, the entire system may be powered down. As opposed to the dual redundant approach discussed above, the current sharing between regulation engines 260a–260c is generally active. Accommodating this design feature, however, increases the cost and complexity of the regulator complex 220.

Figure 3:
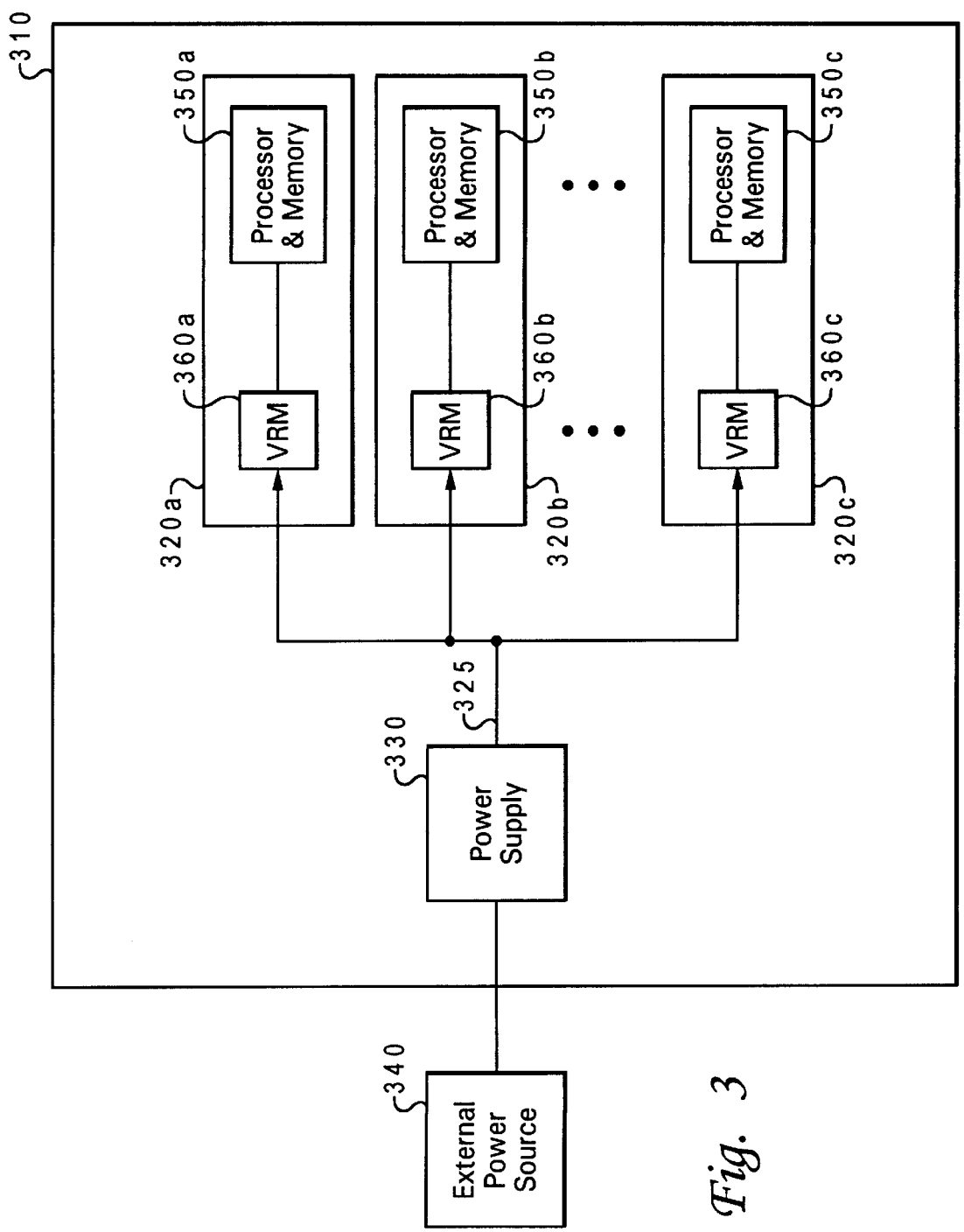
FIG. 3 illustrates a multiple processor apparatus employing a voltage regulation scheme constructed utilizing the principles disclosed by the present invention.

Referring now to FIG. 3, there is depicted a multiple processor apparatus 310 employing a voltage regulation scheme constructed utilizing the principles disclosed by the present invention. Multiple processor apparatus 310, e.g., a N-way processor, includes a power supply 330, such as a conventional DC—DC converter or a AC-DC converter, that converts a source voltage from an external power source 340, which may be a commercial power source or a battery bank, to a voltage level that is suitable for use in multiple processor 310. The voltage provided by power converter 330 is transmitted to a plurality of VRMs, designated first, second and third VRMs 360a, 360b, 360c, via a power bus 325. Also shown in the illustrated embodiment, are first, second and third processors 350a, 350b, 350c, respectively, that are coupled to first, second and third VRMs 360a, 360b, 360c, respectively. It should be noted that each of the processors has only one VRM dedicated to it, in contrast to the voltage regulation redundancy schemes described in FIGS. 1 and 2 above. Thus, in the event of a failure in the voltage regulation stage (VRM) or associated processor, the VRM and processor can be powered down independently of the other processors. Consequently, N−1 processors (where N is the total number of processors in multiple processor 310) continue to do the processing work of multiple processor 310. Since the loss of a processor only affects performance, but not the availability of data, multiple processor 310 could continue operation with additional failures of VRMs and/or processors.

In the illustrated embodiment, each pair of processor and its dedicated VRM, i.e., first processor 350a and first VRM 360a, second processor 350b and second VRM 360b, and third processor 350c and third VRM 360c, reside on first, second and third circuit cards 320a, 320b, 320c, respectively. Locating each pair of processor and dedicated VRM on separate circuit cards provides for easier servicing of multiple processor 310 in the event of a failure. Locating each pair of processor and VRM on separate circuit cards also allows each pair of processor and VRM to be separated from each other on different power domains. Thus the pairs of processors and VRMs are electrically isolated from each other, i.e., a failure occurring in one pair of processor and VRM will generally not effect the other pairs of processors and VRMs. It should be noted that electrically isolating pairs of processors and VRMs does not necessarily require locating them on separate circuit cards, alternatively, in other advantageous embodiments, a processor and its companion VRM are not located together on the same circuit card.

Detecting a failure of a VRM is accomplished, in an advantageous embodiment, utilizing a "Power Good" status signal (not shown) that is typically provided by each individual VRM. The status signal is generally used by multiple processor 310 arbitration/coordination logic (not shown) to degate (logical operation) the powered down processor from the remaining "good" processors. Recovery actions would then be taken to allow the continued operation of the multiple processor 310 without the unavailable resource, i.e., powered down or failed processor.

In sharp contrast to the previously described conventional voltage regulation schemes depicted in FIGS. 1 and 2, servicing multiple processor 310 after a failure is simplified. After detecting a failure and tracing the failure to a particular circuit card, repair is easily accomplished by just replacing the failed circuit card with a substitute card containing another pair of processor and VRM. Furthermore, unlike the previously discussed voltage regulation schemes, the present invention allows repairs to be accomplish without having to shut down multiple processor 310. Since the failed circuit card has already been taken "off-line," there is no need to power down multiple processor 310 to replace the failed circuit card with a new card containing a good pair of processor and VRM. The present invention permits uninterruptable operation of multiple processor 310 even during servicing and/or repair periods.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A voltage regulation system for use with a multiple processor apparatus having a plurality of processors, comprising:

a power converter;

a plurality of voltage regulation modules (VRMs) coupled to said power converter and said plurality of processors, each one of said plurality of VRMs dedicated to only one of said plurality of processors wherein one of said plurality of processors is powered down in response to a failure of said respective dedicated one of said plurality of VRMs.

2. The voltage regulation system as recited in claim 1 wherein said plurality of processors and said plurality of VRMs are equal in number.

3. The voltage regulation system as recited in claim 1 wherein each pair of said processor and said dedicated VRM defines a separate power domain.

4. The voltage regulation system as recited in claim 1 wherein each pair of said processor and said dedicated VRM is located on a separate circuit card.

5. The voltage regulation system as recited in claim 1 wherein said multiple processor apparatus is a N-way processor.

6. The voltage regulation system as recited in claim 1 wherein said power converter is a DC—DC converter.

7. A method of voltage regulation for use with a multiple processor apparatus having a plurality of processors, comprising the steps of:

providing a plurality of voltage regulation modules (VRMs) coupled to a power converter;

dedicating each one of said plurality of VRMs to only one of said plurality of processors; and powering down one of said plurality of processors in response to a failure of said respective dedicated one of said plurality of VRMs.

8. The method as recited in claim 7 wherein said plurality of processors and said plurality of VRMs are equal in number.

9. The method as recited in claim 7 wherein each pair of said processor and said dedicated VRM defines a separate power domain.

10. The method as recited in claim 7 wherein each pair of said processor and said dedicated VRM is located on a separate circuit card.

11. The method as recited in claim 7 wherein said multiple processor apparatus is a N-way processor.

12. The method as recited in claim 7 wherein said power converter is a DC—DC converter.

13. A multiple processor apparatus, comprising:

a power converter;

a plurality of voltage regulator modules (VRMs) coupled to said power converter; and a plurality of processors coupled to said plurality of VRMs, each one of said plurality of VRMs dedicated to only one of said plurality of processors wherein one of said plurality of processors is powered down in response to a failure of said respective dedicated one of said plurality of VRMs.

14. The multiple processor apparatus as recited in claim 13 wherein said plurality of processors and said plurality of VRMs are equal in number.

15. The multiple processor apparatus as recited in claim 13 wherein each pair of said processor and said dedicated VRM defines a separate power domain.

16. The multiple processor apparatus as recited in claim 13 wherein each pair of said processor and said dedicated VRM is located on a separate circuit card.

17. The multiple processor apparatus as recited in claim 13 wherein said multiple processor apparatus is a N-way processor.

* * * * *